Aug. 7, 1962

G. H. BINGHAM, JR 3,047,890

METHOD OF MAKING MACHINE-MADE PLATFORM-STYLE SHOES

Filed Aug. 30, 1960

INVENTOR.

George H. Bingham, Jr.

BY Roberts Cushman & Grover

ATT'YS.

Aug. 7, 1962 G. H. BINGHAM, JR 3,047,890
METHOD OF MAKING MACHINE-MADE PLATFORM-STYLE SHOES
Filed Aug. 30, 1960 4 Sheets-Sheet 2

INVENTOR.
George H. Bingham, Jr.
BY Roberts Cushman & Grosse
ATT'YS.

Aug. 7, 1962   G. H. BINGHAM, JR   3,047,890
METHOD OF MAKING MACHINE-MADE PLATFORM-STYLE SHOES
Filed Aug. 30, 1960   4 Sheets-Sheet 3

INVENTOR.
George H. Bingham, Jr.
BY
ATT'YS.

Aug. 7, 1962  G. H. BINGHAM, JR  3,047,890
METHOD OF MAKING MACHINE-MADE PLATFORM-STYLE SHOES
Filed Aug. 30, 1960  4 Sheets-Sheet 4
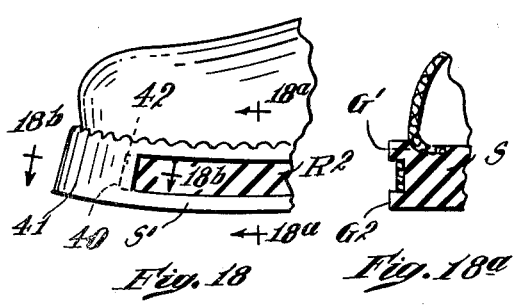
Fig. 18
Fig. 18a
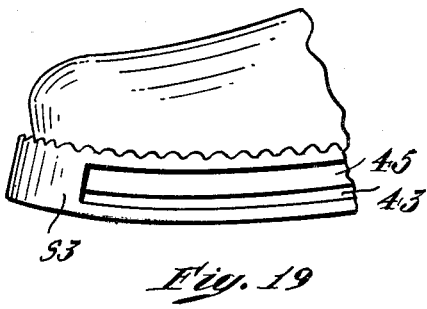
Fig. 19
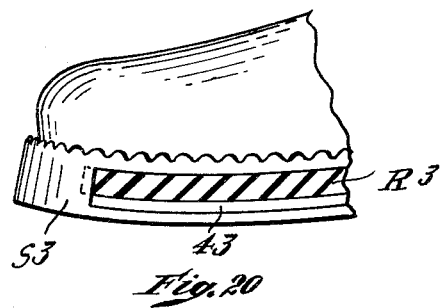
Fig. 20
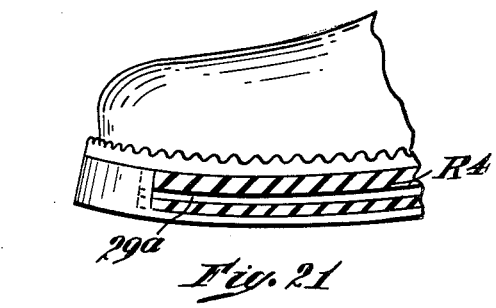
Fig. 21
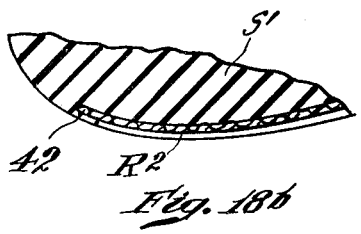
Fig. 18b
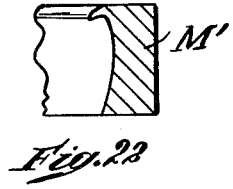
Fig. 22
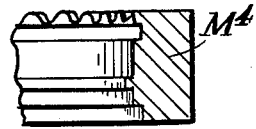
Fig. 23
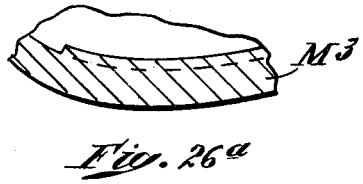
Fig. 26a
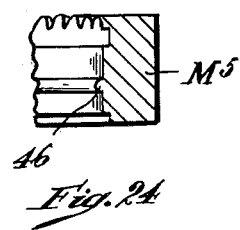
Fig. 24
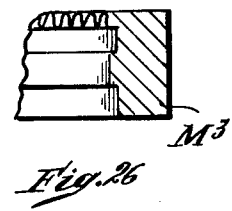
Fig. 26
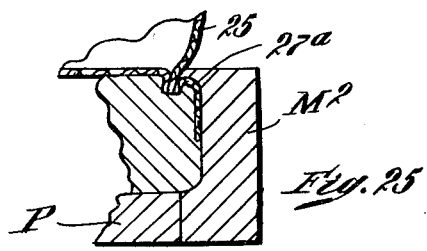
Fig. 25
INVENTOR.
George H. Bingham, Jr.
BY
Roberts Cushman & Grover
ATT'YS United States Patent Office 3,047,890
Patented Aug. 7, 1962

3,047,890
METHOD OF MAKING MACHINE-MADE PLATFORM-STYLE SHOES
George H. Bingham, Jr., Westminster, Md., assignor to Cambridge Rubber Company, Taneytown, Md., a corporation of Maryland
Filed Aug. 30, 1960, Ser. No. 52,899
7 Claims. (Cl. 12—142)

This invention pertains to footwear, in particular to footwear of the casual type, usually having an upper of textile fabric with or without other material, for instance, leather, and a thick but pliable outer sole, for example, one of felt or a rubber compound or other elastomer.

Such footwear includes shoes of the so-called "platform type" wherein the thick sole may comprise a plurality of superposed layers, each having an elastically yieldable core, for example, a layer of felt, and a marginal binding of thin leather, textile fabric or other material providing a binding for the core layer and which is usually designed to impart an ornamental effect, as by color or texture, and which usually provides an edge which is convexly rounded. On the other hand, in the manufacture of the more common type of casual shoe, the thick outer sole is a single layer of rubber compound or the like which is usually die-cut from a sheet of the material so that thus, the outer sole has a straight or vertical edge fully exposed to view. In most cases this edge is not ornamental as respects either texture or color.

While some attempts have been made to impart an ornamental appearance to the edge of such a sole so as more closely to stimulate the true platform sole, as, for example, by adhesively bonding, to the edge of the rubber sole, a ply of thin cloth or other fabric material, this practice has not been widely adopted because of the difficulty of providing a permanent bond between the covering material and the material of the sole itself, so that the flexing of the sole during wear soon loosens the fabric, resulting in a ragged appearance which is anything but ornamental.

The present invention has for an object the provision of a novel method of making footwear, particularly shoes of the casual type (wherein the outer sole consists of a unitary mass of rubber die-cut from a sheet of the same material), but wherein the exposed edge of the outer sole, in the completed shoe, has an ornamental texture and/or color, for example resulting from the permanent and secure bonding of textile fabric or other pervious material to the edge of the sole proper. A further object is to provide a method of making footwear of the above description wherein the edge of the sole may have imparted to it a contour similar to that which is commonly found in platform shoes; that is to say, an edge which is convexly curved and with the core element of the sole concealed, and also to provide a method of making a shoe having a sole having a portion, at least, of its outer edge permanently covered by a ribbon of textile fabric material which is pervious to the material of the outer sole and wherein the exposed margin of the upper surface of the sole has indentations suggestive of the stitches in the welt of a Goodyear welt shoe. A further object is to provide a method of making an outer sole, ready for application to the bottom of a lasted upper, in accordance with a customary practice, but wherein the peripheral edge of the outer sole has permanently bonded thereto and, if desired, embedded therein, material of an ornamental character. A further object is to provide novel footwear resultant from the practice of the herein developed method.

Other and further objects and advantages of the invention will be pointed out in the following more detailed description, and by reference to the accompanying drawings wherein.

Figure 1:
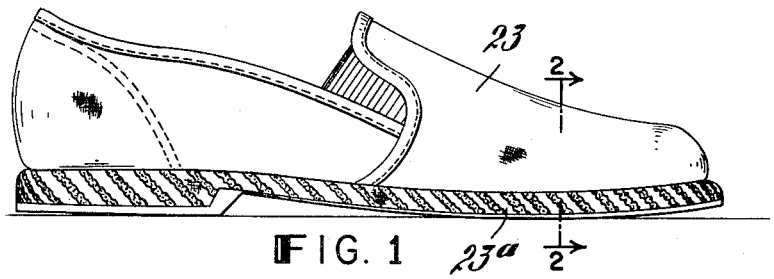
FIG. 1 is a diagrammatic side elevation of a casual shoe having a thick outer sole of rubber or the like, but with the edge of the outer sole concealed by a layer of covering material, and wherein the edge is convexly curved to resemble the sole of a platform shoe.
Figure 4:
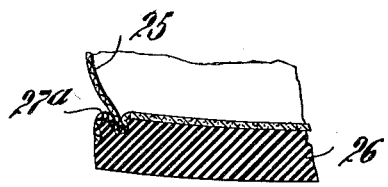
FIG. 4 is a fragmentary diagrammatic section on line 4—4 of FIG. 3, showing how the upper margin of the burlap extends inwardly over the margin of the sole proper to contact the lower edge of the shoe upper.
Figure 2:
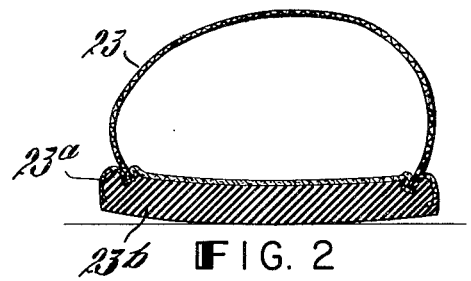
FIG. 2 is a section on the line 2—2 of FIG. 1.
Figure 17:
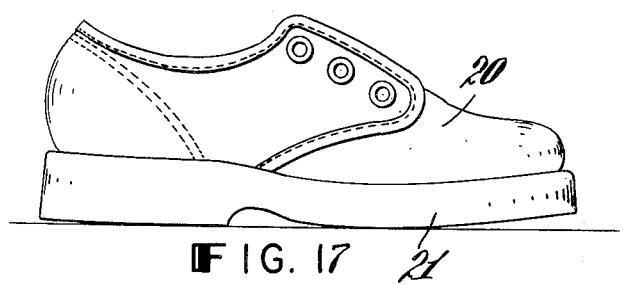
Figure 6:
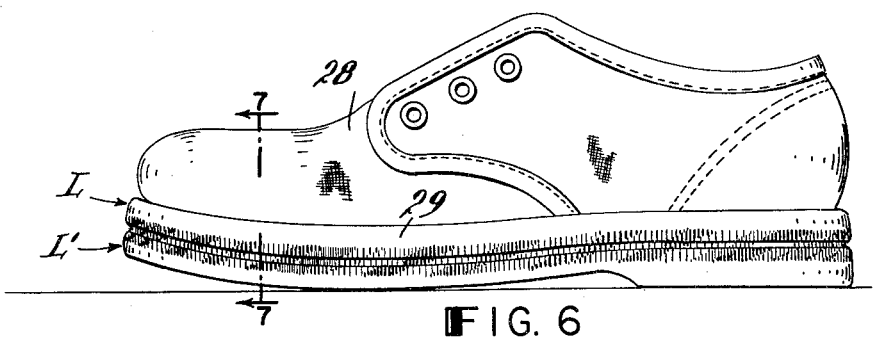
FIG. 6 is a side elevation of a casual shoe similar to that of FIG. 1, but wherein the edge of the outer sole is concealed by an adhering ply of textile fabric and wherein the edge of the outer sole is indented approximately midway its height so as to form two superposed lobes closely approximating in appearance a double layer platform sole.
Figure 9:
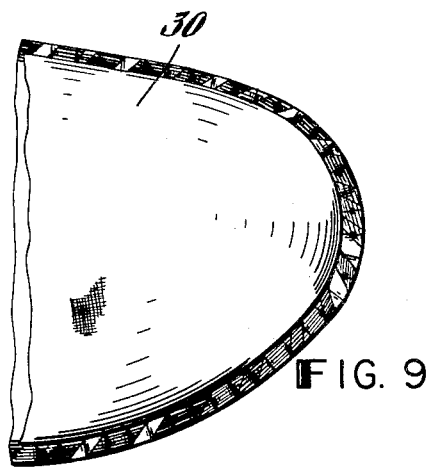
Figure 8:
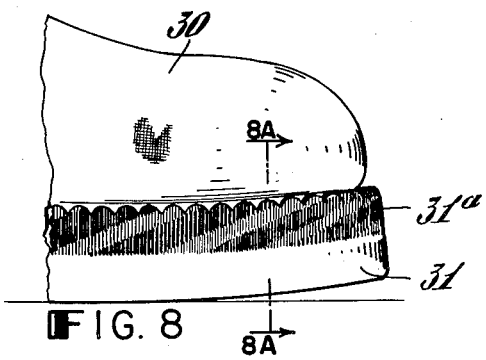
Figure 8A:
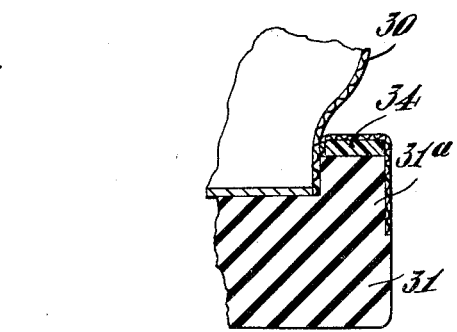
Figure 10:
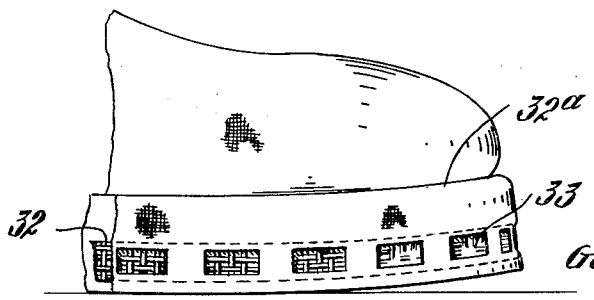
Figure 11:
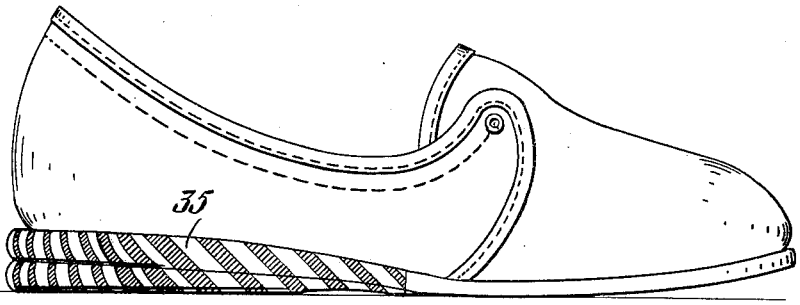
Figure 13:
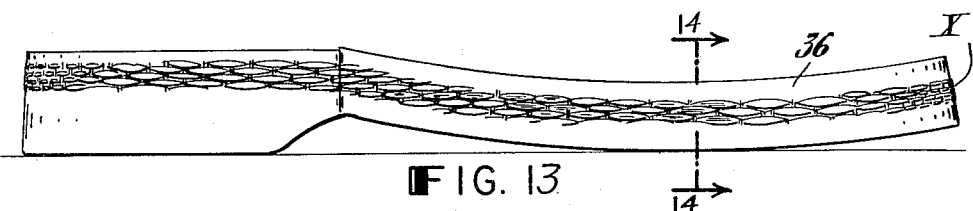
Figure 14:
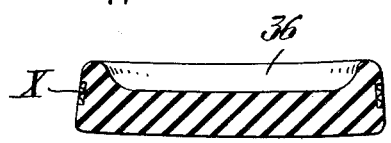
Figure 15:
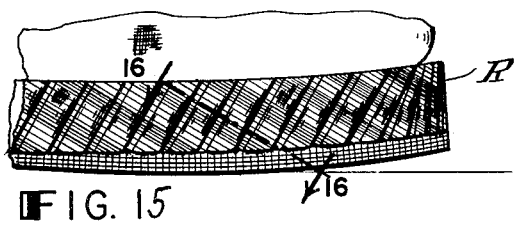
Figure 16:
Figure 12:
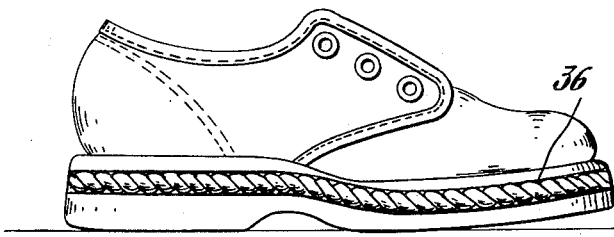

FIG. 8 is a fragmentary elevation showing the forward part of a casual shoe having a unitary outer sole but wherein the upper edge of the outer sole has been indented to form a series of ribs resembling the welt of a welt shoe and wherein the upper half of the outer sole is concealed by a layer of textile fabric which overlaps the indented margin of the outer sole and which has been integrally bonded to the material of the outer sole while the indentations are being formed;

FIG. 8a is a fragmentary vertical section substantially on the line 8a—8a of FIG. 8, showing how the outer sole has been provided with a narrow strip of plastic on its upper margin prior to the application of the textile material;

FIG. 9 is a fragmentary plan view of the parts shown in FIG. 8;

FIG. 10 shows another arrangement wherein the edge of the outer sole has first been covered with a layer of burlap and then a ply of thin, close woven textile material has been placed over the burlap, the thin material having perforations through which the burlap, which may be of contrasting color, may be seen;

FIG. 11 is a view generally similar to FIG. 1, but showing the rear portion of the outer sole as having been indented longitudinally like the outer sole of FIG. 6, thus providing a close simulation of certain types of platform shoes;

FIG. 12 is a side elevation of a casual shoe having an outer sole wherein a strip of textile material, for example, burlap, a coarse braid or piece of rope, has been embedded in the outer edge of the outer sole so that it is flush with the uncovered material said edge;

FIG. 13 is a side elevation of an outer sole, for example, a unitary mass of cured rubber compound, ready for application to the bottom of a lasted upper, but having embedded in its peripheral edge a strip of textile fabric or other material of a contracting color or texture;

FIG. 14 is a transverse section on the line 14—14 of FIG. 13;

FIG. 15 is a fragmentary side elevation of an outer sole comprising a unitary mass of rubber having the upper portion of its edge covered with textile or other material which has been indented into the rubber by diagonally extending elongated indentations;

FIG. 16 is a fragmentary section on line 16-16 of FIG. 15;

FIG. 17 is a side elevation of a casual shoe of the usual type having a thick, die-cut outersole;

FIG. 18 is a fragmentary side elevation illustrating a casual shoe having a thick outer sole of elastomeric material whose edge, except at the ends of the shoe has ornamental material embedded therein, and with the upper margin of the ornamental material indented to stimulate a welt;

FIG. 18a is a fragmentary vertical section on the line 18a—18a of FIG. 18;

FIG. 18b is a fragmentary horizontal section on line 18b—18b of FIG. 18;

FIG. 19 is a view similar to FIG. 18, showing the shoe as it would appear were the ornamental material of FIG. 18 omitted;

FIG. 20 is a view generally similar to FIG. 18, but showing ornamental material differentially arranged;

FIG. 21 is a view generally similar to FIG. 18, but showing the ornamental material as having a longitudinal indentation between its upper and lower edges;

FIG. 22 is a fragmentary vertical section showing a ring mold of a type useful in making a shoe like that of FIGS. 1 and 2;

FIG. 23 is a view similar to FIG. 22, but showing a ring mold useful in making a shoe such as that of FIG. 20;

FIG. 24 is a view similar to FIG. 22, but showing a ring mold such as would be useful in making a shoe like that of FIG. 21;

FIG. 25 is a section showing a ring mold useful in making a shoe like that of FIG. 4, and showing shoe material within the mold;

FIG. 26 is a view similar to FIG. 22, but showing a ring mold useful in making a shoe like that of FIG. 18; and FIG. 26a is a fragmentary horizontal section through the ring mold of FIG. 26.

Referring to FIG. 17, the numeral 20 designates the upper of a conventional shoe of the casual type and the numeral 21 indicates a thick outer sole of rubber compound or the like. Such soles are commonly die-cut from sheet material and thus the edge of the sole is substantially vertical. At this edge, the material of the sole is exposed and usually no attempt is made to conceal the material or to impart an ornamental appearance.

In FIG. 1, wherein a shoe embodying the present invention is illustrated, the shoe is also of the casual type, having the upper 23, but in this instance, the major portion of the peripheral edge of the thick outer sole of rubber or other elastomeric material is concealed by covering material 23a (FIG. 2), for example, coarse textile fabric. This fabric is applied to the edge of the outer sole blank as a ribbon-like strip while the outer sole blank is in uncured or partially cured condition. Desirably adhesive is interposed between the ribbon and the outer sole blank so as temporarily to hold the parts in assembled relation preparatory to the attachment of the outer sole blank to the upper. The assembled sole blank and ribbon are placed in the mold of the machine whereby the outer sole blank and lasted upper are united, but in this instance, the ring mold M is so shaped (FIG. 22), as to cause the edge of the outer sole blank to become outwardly convex or rounded. This rounding of the edge of the outer sole blank causes the upper margin of the ribbon to be embedded, together with the lower margin of the upper 23 in the material 23b of the outer sole. Moreover, the pressure to which the parts are applied is such as to cause some of the rubber of the outer sole blank to impregnate the fabric of the ribbon and thus a permanent bond is provided such that the ribbon will remain in place throughout the life of the shoe. In part, because of the rounding of the edge of the sole blank, and in part, because of the textile material which conceals the rubber sole, the resultant sole has much the appearance of that of the hand-made sole of a shoe of the platform type.

Figure 3:
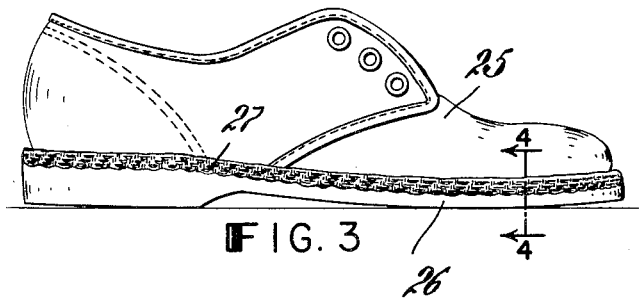
FIG. 3 is a view similar to FIG. 1, but showing the outer sole as having a substantially vertical edge, but with the upper portion of said edge covered and concealed by a layer of open mesh textile fabric, for example, burlap which is securely held in place by the material of the sole itself which has penetrated the burlap.

In FIG. 3 the shoe illustrated comprises the upper 25 and the outer sole 26, with a ribbon 27 of coarse mesh textile fabric, for example, a flat braid, covering and concealing the upper portion of the peripheral edge of the sole while leaving the lower portion of the edge exposed for contrast. The ribbon is assembled with the outer sole blank in the same way as above suggested, and a ring mold $M^3$, like that of FIG. 25, may be employed. As the result of the pressure and heat applied for bonding the sole blank and upper, the material of the sole blank penetrates the meshes of the fabric, providing a secure and permanent bond. As shown in FIG. 4, the upper margin 27a of the fabric overlies the margin of the upper surface of the outer sole with the extreme edge of the fabric contacting the shoe upper. In this shoe the outer surface of the ribbon is substantially flush with the exposed surface of the outer sole, and the meshes of the ribbon are completely filled with the elastomeric material.

Figure 7:
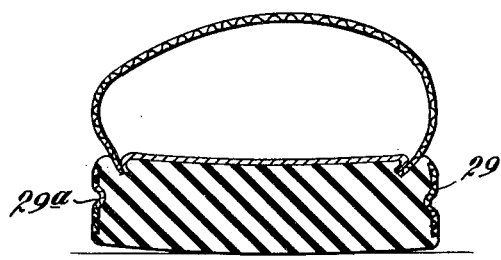
FIG. 7 is a diagrammatic section on line 7—7 of FIG. 6.

In the arrangement illustrated in FIGS. 6 and 7, the shoe upper is shown at 28 and a strip 29 of textile fabric is shown as concealing the mid-portion of the edge of the outer sole. After this textile material, in the form of a ribbon, has been assembled with the outer sole blank, the assembly is placed in a mold, wherein the ring member is so shaped as to form a shallow channel in the ribbon and the edge of the sole blank along a longitudinally extending groove 29a (FIG. 7), approximately midway between the upper and lower surfaces of the sole blank, while causing the portions of the sole, above and below the groove, to become convex. This results in forming longitudinally extending superposed lobes L, $L^1$ (FIG. 6), each having an outwardly convex surface and each including a partial covering, at least, of textile material. The result is a shoe which closely resembles one having a platform sole. The formation of the indentation reuslts in a high unit pressure at the bottom of the groove which forces the material of the sole into the structure of the ribbon and thus insures an integral bond between the ribbon and the material of the outer sole.

In FIG. 8 is illustrated a portion of a shoe having the upper 30 and the outer sole 31, and having a ribbon 31a of textile material which conceals the upper portion of the peripheral edge of the outer sole, leaving the lower part uncovered. The upper margin of the ribbon overlaps the margin of the upper surface of the outer sole and this upper margin of the ribbon is indented into the material of the outer sole blank, by the use of a ring mold having a toothed upper edge, as shown in FIGS. 23, 24 and 26, thus providing a secure anchorage of the ribbon because, since, in forming the indentations, the ribbon is forced downwardly into the substance of the outer sole blank. The result is to simulate the welt of a welt shoe. As noted, the indentation of the ribbon results in a very secure bonding of the ribbon to the outer sole while incidentally producing an ornamental effect.

The arrangement of FIG. 8a is generally similar to that of FIG. 8 except that a narrow band 34 of plastic material is applied to the margin of the upper surface of the outer sole blank before the covering ribbon is applied. If such band 34 be of a color contrasting with that of the outer sole material and ribbon its penetration into the meshes of the fabric, during the indentation of the latter, gives the appearance of a welt strip of a material different from that of the fabric covering.

The sole of the shoe shown in FIG. 10 has a strip 32 of burlap applied to the peripheral edge of the outer sole and over this burlap is arranged a ribbon 32a of thin, closely woven textile material. As shown, this ribbon 32a has perforations 33 through which the underlying burlap may be seen. The coarse-mesh burlap becomes firmly bonded to the material of the outer sole by the action of the mold, and the textile ribbon 32a may readily be adhered to the burlap (also textile) by the use of an interposed adhesive of conventional type, although ordinarily enough of the material of the sole may exude from the outer face of the burlap to bond the ribbon to the burlap without interposed adhesive. In any event, some of the material of the sole will be forced outwardly into the perforations of the ribbon 32a, thus assisting in providing a secure anchorage for the latter ribbon, and if the burlap be of a color contrasting with that of the outer ribbon, this color will be visible through the perforations, thus providing an ornamental appearance.

In FIG. 11 a shoe is shown wherein the edge of the outer sole has been covered with a textile ribbon 35 about its heel portion and forwardly along the shank but is omitted at the forepart. Where this material conceals the sole edge, it is indented, similarly to that of FIGS. 6 and 7, so that, as a resultant, the shoe closely resembles one having a handmade platform, while at the same time the ribbon is firmly united to the outer sole.

In FIG. 12 a shoe is illustrated, wherein the edge of the outer sole has embedded therein, between its upper and lower parts, an ornamental strip or ribbon 36, for example, of very coarse fabric, for example, a textile braid, or a flat rope, so embedded in the material of the outer sole that it is flush with the exposed surfaces of the sole edge above and below it while its interstices are filled with the sole material.

In the shoe of FIG. 18, the ornamental ribbon $R^2$ is sunken into the edge of the sole $S^1$, so that the upper and lower margins $G^1$ and $G^2$ (FIG. 18a) of the sole edge protrude beyond the outer surface of the ribbon, thus helping to protect the ribbon from abrasion. However, in this shoe, the ribbon extends along the sides, only, of the shoe, terminating as shown, for example, at 40 (FIG. 18), rearwardly at the end of the shoe, so that at the end (toe and preferably the heel), the edge 41 of the sole material itself is exposed for its full depth, this being the point where exposure to wear is greatest. Preferably, at its terminal end, the ribbon is completely embedded in the material of the sole $S^1$, as indicated at 42 (FIGS. 18 and 18b), as by the use of the ring mold $M^3$ (FIGS. 26 and 26a). Thus the ribbon is solidly anchored to the sole material.

The shoe of FIG. 20 is generally similar to that of FIG. 18, except that below the lower edge of the ribbon $R^3$ the edge of the sole $S^3$ has a groove 43 of a depth greater than the thickness of the ribbon. This groove provides added ornamental effect and may, if desired, receive coloring or other material contrasting with the ribbon. Such a sole edge may be formed by the use of a ring mold $M^4$, such as illustrated in FIG. 23 (but which in horizontal section at its end may be like the ring mold $M^3$, as illustrated in FIG. 26a).

Such a ring mold $M^4$, if employed without first having applied the ribbon $R^3$ to the edge of the sole blank, would produce a sole edge such as illustrated in FIG. 19, having an empty channel 45 and groove 43 which could, of course, if desired, receive coloring or other material during the process of completing the shoe.

The shoe of FIG. 21 is generally like that of FIG. 18, but the ribbon $R^4$ which ornaments its edge is indented intermediate its upper and lower edges and by the use of the ring mold $M^5$ (FIG. 23) having a narrow rib 46, which forces the ribbon inwardly during the molding process. Embedding of the ribbon by the action of this rib assists in providing a permanent anchorage of the ribbon to the material of the sole and also imparts a further ornamental appearance to the sole edge.

Figure 5:
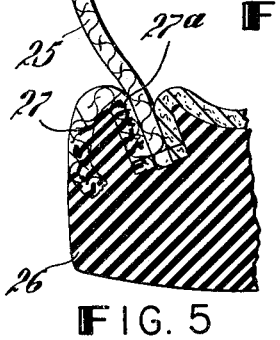
FIG. 5 is a fragmentary section similar to FIG. 4, but to much larger scale.

In FIG. 22, there is shown, in section, a ring mold $M^1$ such as would be useful in making a shoe of the type illustrated in FIGS. 1 and 2; while in FIG. 25 there is illustrated a mold comprising the bottom plate P and ring $M^2$ useful in making a shoe like that of FIGS. 4 and 5.

While as above described, the textile ribbon or other ornamental material is conveniently united to the sole as a concomitant to the bonding of the sole and upper of the shoe, it is within the scope of the invention to attach the ribbon to the outer sole before the latter is assembled with the lasted upper. This may be desirable when the shoe is made according to some processes which involve the complete or nearly complete curing of the outer sole before it is attached to the upper. Thus, in FIGS. 13 and 14 a molded outer sole 36 is shown as having embedded in its edge a strip of textile fabric X which was assembled with the uncured sole blank and pressed into the latter during the curing operation. A sole thus prepared may be applied to the lasted upper according to customary procedure and the completed shoe will have the same general appearance as one which results from the above described practice wherein the ribbon of textile material is united to the sole while the latter is being bonded to the upper.

In FIGS. 15 and 16 a sole like that of FIG. 8 is illustrated, but in which the covering ribbon R of textile fabric covers the entire edge of the sole W, and wherein the material of the sole and the ribbon have been provided with indentations T (FIG. 16) which extend diagonally and transversely of the sole edge. The forming of such indentations serves to provide an intimate contact between the ribbon and the material of the sole. Obviously, indentations otherwise arranged than as above specifically described may be provided, primarily to insure bonding of the ribbon to the sole, although also affording a means of obtaining an ornamental effect.

While certain desirable embodiments of the invention have herein been described and illustrated, it is to be understood that the invention is broadly inclusive of any and all modifications falling within the scope of the appended claims.

I claim:

1. That method of making footwear of the kind wherein an outer sole of elastomeric material is united by the application of heat and pressure to the lower margin of a lasted upper, said method comprising as steps: providing an incompletely cured outer sole blank; providing a ribbon of a material which is substantially unaffected by the heat to which the outer sole blank is subjected in bonding the latter to the margin of the upper, but which is so porous that, in response to pressure applied to the ribbon during the operation of bonding together the upper and outer sole, some of the material of the outer sole blank enters the pores of the ribbon and permanently unites it to the outer sole; applying said ribbon to the peripheral edge of the outer sole blank; and subjecting the ribbon and blank to such a temperature and pressure as to cause material of the blank to permeate the ribbon while completing the curing of the blank.

2. The method according to claim 1, wherein the peripheral edge of the outer sole blank, which is provided, is substantially like that of a blank produced by die-cutting from sheet material and the ribbon of textile material is initially so arranged, in assembling it with the outer sole blank, that the upper margin of the ribbon projects above the level of the upper surface of the outer sole blank, and, in applying heat and pressure, the upwardly projecting margin of the ribbon is forced downwardly into such intimate contact with the exposed marginal top surface of the outer sole blank as to become impregnated with the outer sole material and permanently bonded to the outer sole, with the extreme edge of the ribbon closely adjacent to the shoe upper.

3. The method according to claim 2, wherein while applying heat and pressure that portion of the ribbon which projects above the level of the upper surface of the outer sole blank is forced downwardly into the material of the outer sole blank to form a series of indentations with intervening, upwardly directed ribs.

4. The method according to claim 1, wherein the peripheral edge of the outer sole blank, which is provided, is substantially like that of a blank produced by die-cutting from sheet material and the ribbon is of a width such as to conceal the major part of the edge of the outer sole of the finished article of footwear but to leave the lower margin of said edge exposed, and, during the bonding of the upper and outer sole blank, pressure is so applied to the ribbon of textile material as permanently to bond it to the edge of the outer sole blank and to cause the covered edge of said blank to become convexly curved at any radial section.

5. The method according to claim 1, wherein the peripheral edge of the outer sole blank, which is provided, is substantially like that of a blank produced by die-cutting from sheet material, said method including the step of applying localized pressure to the ribbon along a line extending peripherally of the outer sole blank thereby to sink the ribbon into the substance of the outer sole blank, leaving a portion of the material of the outer sole blank protruding outwardly beyond the outer surface of the ribbon.

6. The method according to claim 1, wherein a ribbon of coarse-meshed woven fabric is first attached to the peripheral edge of the outer sole, and a second ribbon of finer weave is then adhered to the outer surface of the first ribbon, the second ribbon having perforations therethrough, and applying such pressure to the second ribbon, while bonding the outer sole to the upper as to cause material of the outer sole to permeate the coarse woven fabric and to enter the perforations of the finer woven fabric, thereby bonding both ribbons to the outer sole.

7. That method of making footwear of the kind wherein an outer sole blank of incompletely cured elastomeric material is cured and united under pressure and heat to the lower margin of a lasted upper, said method comprising as steps: providing an incompletely cured outer sole blank; providing a ribbon of textile fabric of a surface texture and appearance visually distinct from that of the material of the blank and of a character such that it is pervious to the material of the blank when the latter is exposed to the temperature and pressure to which it is subjected in bonding the blank to the lasted upper; applying said ribbon to the peripheral edge of the outer sole blank; and thereafter subjecting the ribbon to pressure, during the operation of bonding together the upper and the outer sole blank, in such a way as to cause material of the outer sole blank to enter the interstices of the ribbon and permanently unite the ribbon to the outer sole.

References Cited in the file of this patent

UNITED STATES PATENTS

| | | |
|---|---|---|
| 1,937,074 | Vicente | Nov. 28, 1933 |
| 2,019,544 | Riddock | Nov. 5, 1935 |
| 2,074,579 | Fesl | Mar. 23, 1937 |
| 2,210,753 | Field | Aug. 6, 1940 |
| 2,276,686 | Chevalier | Mar. 17, 1942 |
| 2,481,389 | Campagna | Sept. 6, 1949 |
| 2,499,751 | Hoza | Mar. 7, 1950 |
| 2,528,357 | Glassman | Oct. 31, 1950 |
| 2,543,183 | Maling | Feb. 27, 1951 |
| 2,694,871 | Rollman | Nov. 23, 1954 |
| 2,789,295 | Rollman et al. | Apr. 23, 1957 |
| 2,918,735 | Johnston | Dec. 29, 1959 |
| 2,976,624 | Rollman | Mar. 28, 1961 |
| 2,990,626 | Bowen | July 4, 1961 |

FOREIGN PATENTS

| | | |
|---|---|---|
| 702,914 | Great Britain | Jan. 27, 1954 |